United States Patent
Niu et al.

(10) Patent No.: US 8,971,431 B1
(45) Date of Patent: Mar. 3, 2015

(54) CHANNEL ESTIMATION FOR OFDM SIGNALS

(71) Applicant: Amlogic Co., Ltd., Santa Clara, CA (US)

(72) Inventors: Jin Niu, Shanghai (CN); Cindy Wang, Mountain View, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 0 days.

(21) Appl. No.: 14/015,619

(22) Filed: Aug. 30, 2013

(51) Int. Cl.
*H04K 1/10* (2006.01)
*H04L 25/02* (2006.01)

(52) U.S. Cl.
CPC .......... *H04L 25/0228* (2013.01); *H04L 25/024* (2013.01)
USPC ....................................................... 375/260

(58) Field of Classification Search
CPC ............ H04L 25/0236; H04L 25/0208; H04L 25/0228; H04L 25/0232; H04L 25/0212; H04L 25/22; H04L 5/0007; H04L 5/0048; H04L 27/2647
USPC ....................................................... 375/260
See application file for complete search history.

(56) References Cited

U.S. PATENT DOCUMENTS

| | | | | |
|---|---|---|---|---|
| 5,680,419 A | * | 10/1997 | Bottomley | ..................... 375/347 |
| 6,320,919 B1 | * | 11/2001 | Khayrallah et al. | ........... 375/347 |
| 7,376,106 B2 | * | 5/2008 | Ben-David et al. | ............ 370/335 |
| 7,433,433 B2 | | 10/2008 | Wilhelmsson et al. | |
| 7,474,611 B2 | | 1/2009 | Svensson et al. | |
| 7,573,965 B2 | | 8/2009 | Iancu et al. | |
| 8,126,074 B1 | * | 2/2012 | Lou et al. | ....................... 375/262 |
| 2003/0185326 A1 | * | 10/2003 | Kolze | ............................. 375/371 |
| 2004/0066773 A1 | * | 4/2004 | Sun et al. | ....................... 370/343 |
| 2006/0269016 A1 | | 11/2006 | Long et al. | |
| 2007/0211827 A1 | | 9/2007 | Baggen et al. | |
| 2012/0045007 A1 | * | 2/2012 | Panah et al. | ..................... 375/267 |

OTHER PUBLICATIONS

Clark, "Adaptive Channel Estimates for an HF Radio Link", IEEE Trans. on Communications, vol. 37, pp. 918-926, Sep. 1989.*

* cited by examiner

*Primary Examiner* — Juan A Torres
(74) *Attorney, Agent, or Firm* — Venture Pacific Law, PC

(57) ABSTRACT

A method for channel estimation of a signal, comprises the steps: estimating a channel response for pilot carriers of the signal; and estimating a channel response for non-pilot carriers of the signal as a function of the channel response for the pilot carriers of the signal and channel estimation coefficients for the pilot carriers, wherein a symbol of the signal is decoded as a function of the estimated channel response for the non-pilot carriers, and wherein certain ones of the channel estimation coefficients are updated as a function of the decoded symbol.

19 Claims, 8 Drawing Sheets

CHANNEL ESTIMATION FOR OFDM SIGNALS

FIELD OF INVENTION

This invention relates to methods for channel estimation of orthogonal frequency divisional multiplexing modulation signals, and, in particular, to methods for channel estimation using the scattered pilots of the signals.

BACKGROUND

Orthogonal frequency division multiplexing ("OFDM") is a multi-carrier transmission technique that uses orthogonal subcarriers to transmit information within an available spectrum. Since the subcarriers are orthogonal to one another, they may be spaced much more closely together within the available spectrum than, for example, the individual channels in a conventional frequency division multiplexing ("FDM") system.

In an OFDM system, the subcarriers may be modulated with a low-rate data stream before transmission. It is advantageous to transmit a number of low-rate data streams in parallel instead of a single high-rate stream since low symbol rate schemes suffer less from inter-symbol interference ("ISI") caused by multipath fading. For this reason, many modern digital communications systems are turning to OFDM as a modulation scheme for signals that need to survive in environments having multipath or strong interference. Many transmission standards have already adopted the OFDM system, including the IEEE 802.11a standard, the Digital Video Broadcasting Terrestrial ("DVB-T"), the Digital Audio Broadcast ("DAB"), and the Digital Television Broadcast ("T-DMB").

At the transmitter side for OFDM signals, the data is encoded, interleaved, and modulated to form data symbols. Overhead information is added, such as pilot symbols. The symbols (data plus overhead) are organized into OFDM symbols. Each symbol is allocated to represent a component of a different orthogonal frequency. An inverse fast Fourier transform ("IFFT") is applied to the OFDM symbol to generate time samples. Cyclic extensions are then added to the signal and passed through a digital-to-analog converter. Finally, the transmitter transmits the signal to a receiver through a channel (e.g., over the air).

When the receiver receives the signal, the inverse operations are performed on the received signal. The received signal is passed through to an analog-to-digital converter. Also, any cyclic extensions are removed from the signal. The receiver performs a Fast-Fourier transform ("FFT") on the received signal to recover the frequency components of the signal, i.e., the data symbols. Error correction may be applied to the data symbols to compensate for variations in phase and amplitude caused during the propagation of the signal along the channel. The data symbols are then demodulated, de-interleaved, and decoded, to yield the transmitted data.

The variations in phase and amplitude resulting from propagation along the channel are referred to as the channel response. The channel response is usually frequency and time dependent. If the receiver can determine the channel response, the received signal can be corrected to compensate for the channel degradation. The determination of the channel response is called channel estimation. The inclusion of pilot symbols in each OFDM symbol and/or in each subcarrier allows the receiver to carry out channel estimation. The pilot symbols are transmitted with a value known to the receiver. When the receiver receives the OFDM symbol, the receiver compares the received value of the pilot symbols with the known transmitted value of the pilot symbols to estimate the channel response.

Since the channel response can vary with time and with frequency, the pilot symbols are scattered amongst the data symbols to provide as complete a range as possible of channel response over time and frequency. The set of frequencies and times at which pilot symbols are inserted is referred to as a pilot pattern. FIG. 1 illustrates a pilot distribution pattern of the DVB-T system. Referring to FIG. 1, the pilot symbols are scattered amongst the data carrier symbols along the time domain (y-axis) and the frequency domain (x-axis) forming a grid to enable two-dimensional interpolation. The solid black circles represent the pilot symbols, and the empty circles represent the data carrier symbols. The variable K represents the number of subcarriers in the frequency domain. As an example, for DVB-T systems, in the 2K mode, there are a total of 1705 subcarriers; and in the 8K mode there are a total of 6817 subcarriers.

FIG. 2 illustrates a flow chart of the prior art for channel estimation. For channel estimation 24, the channel transfer function H(m,n) at the pilot cells is computed 40 as a function of the FFT output of the signal. Next, time-domain interpolation 42 is applied, providing time-domain interpolator coefficients. The output of that time domain interpolation is inputted to a frequency domain interpolation 44. The frequency-domain interpolation 44 computes the channel transfer function estimates at all non-pilot tones. After frequency-domain interpolation, the estimates of all the transfer functions at all the data carriers are available either through frequency-domain interpolation for all the non-pilot tones or the time-domain interpolator for the non-pilot cells of all the scattered pilot tones. The channel estimation results can be sent to error correction and/or further processing of the received signal.

This prior art method takes advantage of the scattered pilot position. Interpolation in the time domain is performed first to increase the available carriers for interpolation in frequency domain. As such, this method is suitable for a static environment, where carrier statistics do not change between several symbols in time. However, such method is not suitable for a mobile environment, where the carrier statistics can change significantly, even within a span of a few symbols. Therefore, it is desirable to provide new methods for channel estimation that are suitable for a mobile environment, as well as static environments.

SUMMARY OF INVENTION

An object of this invention is to provide methods for channel estimation of signals that are suitable for dynamic environments.

Another object of this invention is to provide methods for channel estimation using a two dimensional adaptive interpolation filter.

Yet another object of this invention is to provide methods for channel estimation that use dynamic coefficients to track channel variations in both the frequency domain and the time domain.

Briefly, the present invention relates to a method for channel estimation of a signal, comprising the steps: estimating a channel response for pilot carriers of the signal; and estimating a channel response for non-pilot carriers of the signal as a function of the channel response for the pilot carriers of the signal and channel estimation coefficients for the pilot carriers, wherein a symbol of the signal is decoded as a function of the estimated channel response for the non-pilot carriers, and wherein certain ones of the channel estimation coefficients are updated as a function of the decoded symbol.

An advantage of this invention is that methods for channel estimation of signals are provided that are suitable for dynamic environments.

Another advantage of this invention is that methods for channel estimation are provided using a two dimensional adaptive interpolation filter.

Yet another advantage of this invention is that methods for channel estimation are provided that use dynamic coefficients to track channel variations in both the frequency domain and the time domain.

DESCRIPTION OF THE DRAWINGS

The foregoing and other objects, aspects, and advantages of the invention will be better understood from the following detailed description of the preferred embodiment of the invention when taken in conjunction with the accompanying drawings in which.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced. The following embodiments relate to channel estimation of an OFDM signal. However, it is understood by a person having ordinary skill in the art that the present invention can be applied to other types of received signals for channel estimation.

Figure 1:
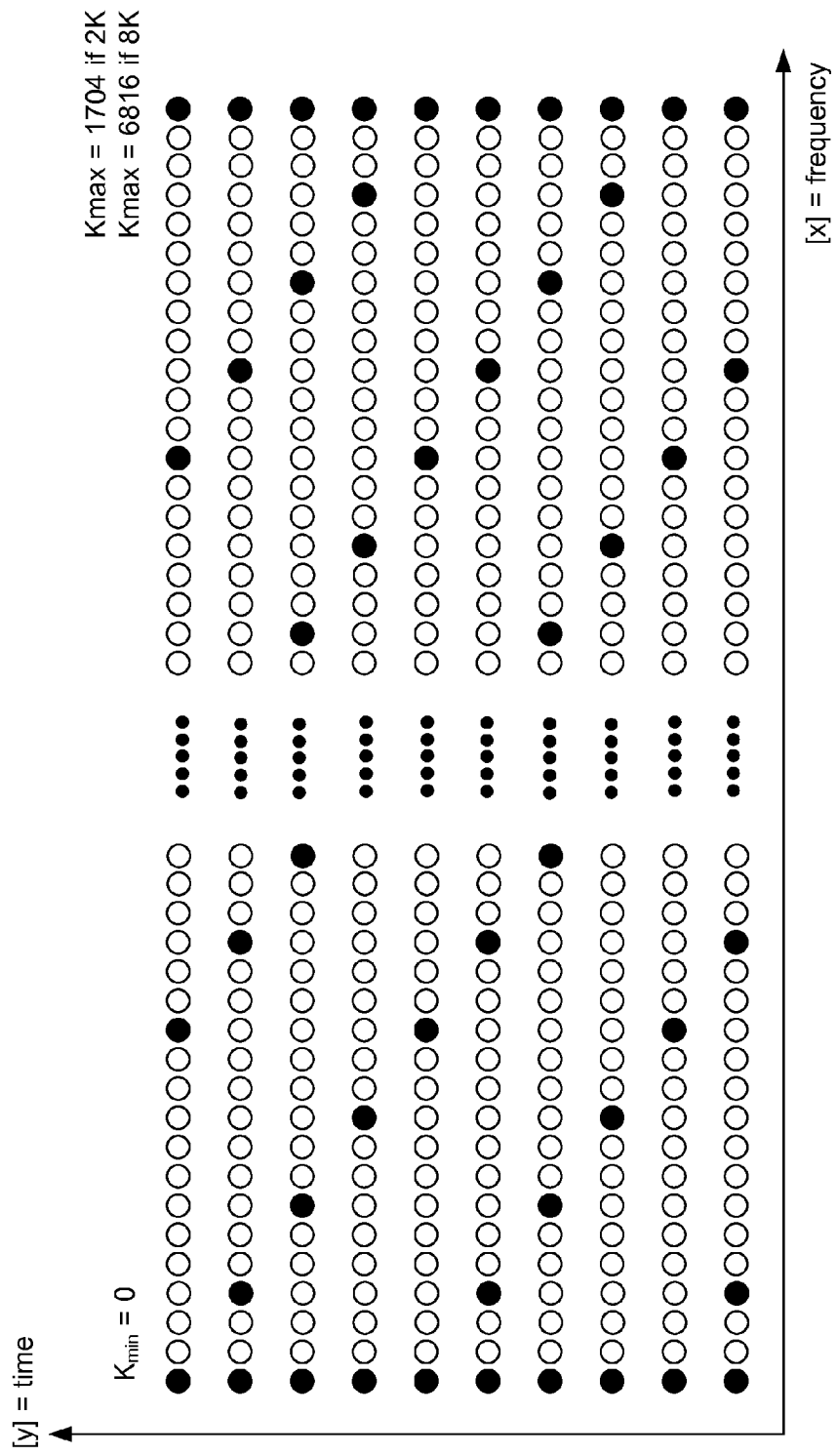
FIG. 1 illustrates a pilot distribution pattern of the DVB-T system.
Figure 2:
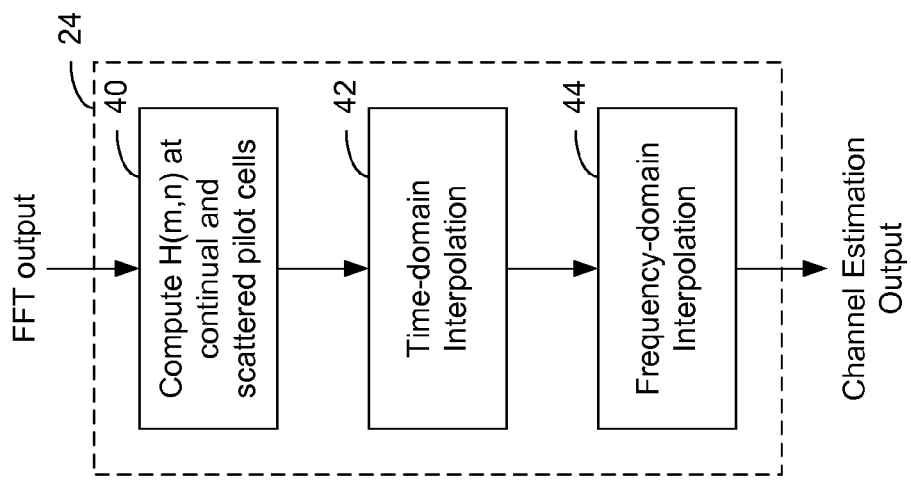
FIG. 2 illustrates a prior art method for channel estimation using a two-step interpolation process.
Figure 3:
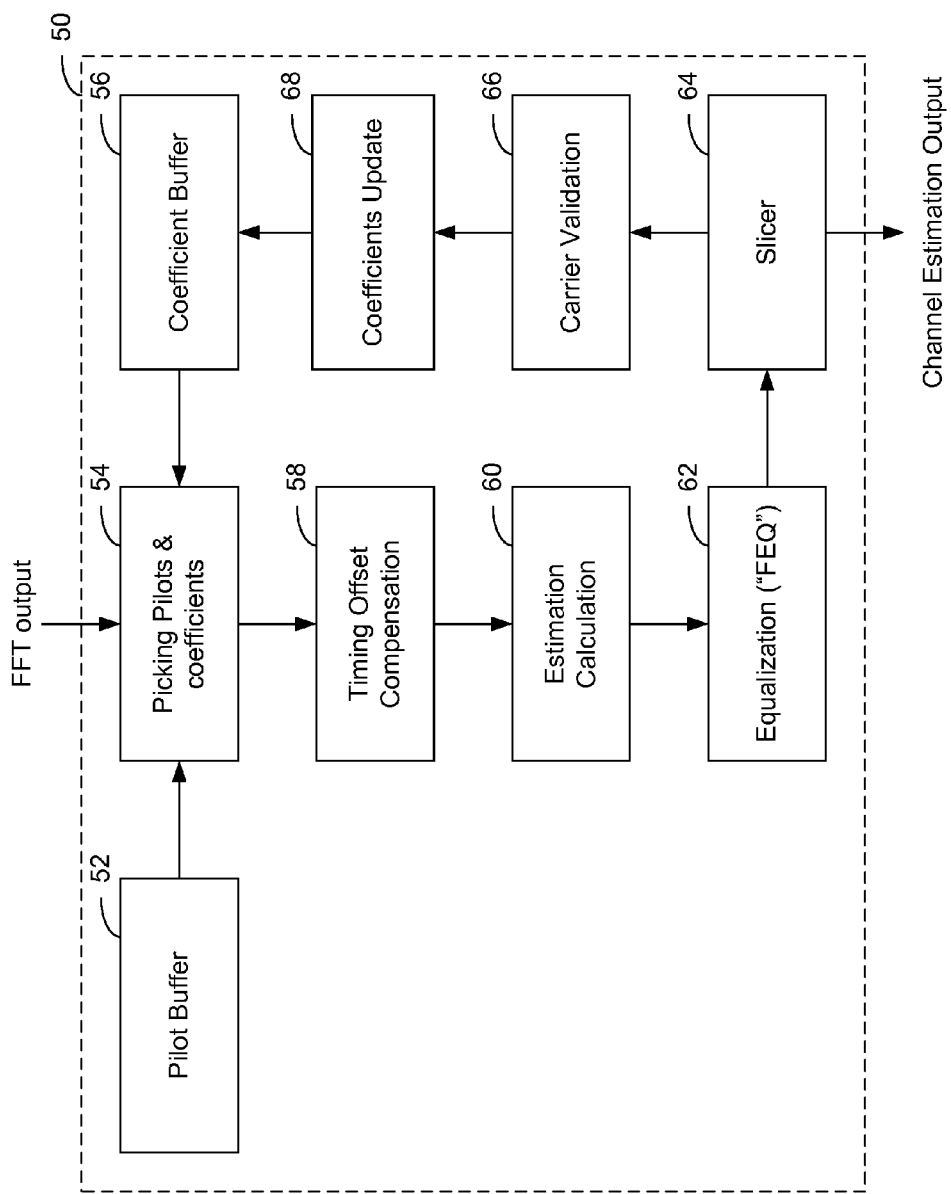
FIG. 3 illustrates a method of the present invention for channel estimation.

FIG. 3 illustrates a method of the present invention for channel estimation. Here, a receiver receives the signal via an antenna in the time domain. A Fast-Fourier transform ("FFT") is applied to the signal to transform the time domain signal to a frequency domain signal. Next, channel estimation 50 is applied to the frequency domain signal.

During channel estimation 50, pilot symbols $Y_P(m,n)$ are selected 54, along with corresponding channel estimation coefficients $C^k(m,n)$. The pilot symbols can be selected from a pilot buffer 52, which stores the pilot pattern of the signal. The channel estimation coefficients can be selected from a coefficient buffer 56, which stores the channel estimation coefficients. Channel estimation coefficients (also known as "interpolation coefficients" or "pilot coefficients") are used to process and interpret the incoming data. As known by a person having ordinary skill in the art, there are several methods for determining channel estimation coefficients.

The pilot buffer 52 and the coefficient buffer 56 size can be determined by the size of the window for training. The larger the window size used for training, the longer training generally takes since there are more values to be taken into consideration.

Once the pilot symbols and channel estimation coefficients are determined, timing offset compensation can be applied 58. Next, the channel estimation for the signal H(m,n) is calculated 60. Once the channel estimate H(m,n) is calculated, equalization is applied 62 to obtain a frequency domain equalizer X(m,n)=Y(m,n)/H(m,n). Next, a slicer can determine the symbol 64 for output $X_d(m,n)$. The slicer output can be outputted to a next stage for decoding of the symbol by a receiver, e.g., to a forward error correction module. The slicer output can also be further inputted for carrier validation 66. Carrier validation determines which channel estimation coefficients are candidates for update.

The selected coefficients can be updated 68 using a 2-D least-mean-squares algorithm or other adaptive interpolation filter that takes into account the frequency domain and time domain. For instance, the updated coefficient can be $$C^{k+1}(m,n)=C^k(m,n)+\mu \cdot \epsilon(m,n)^* Y_p(m,n),\quad \text{Equation [1]}$$

where $\epsilon(m,n)=\hat{H}(m,n)-H(m,n)$ and $\hat{H}(m,n)=Y(m,n)/X_d(m,n)$. The updated coefficients $C^{k+1}(m,n)$ can then be stored in the coefficient buffer 56 for use in the next iteration of channel estimation of the signal. Generally, for each symbol, the coefficients can be updated twice.

Figure 4A:
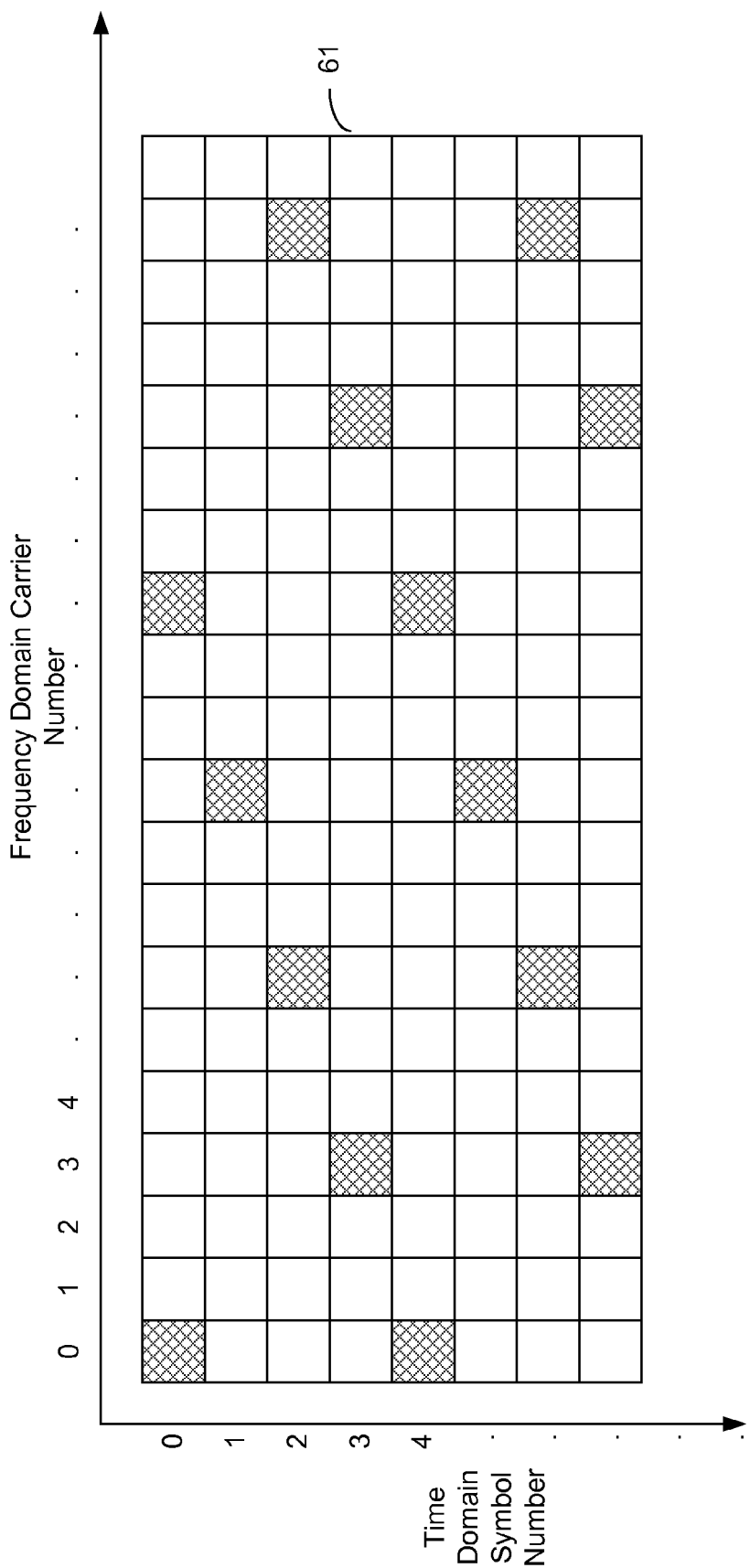
FIGS. 4a-4c illustrate a pilot pattern of a signal.
Figure 4B:
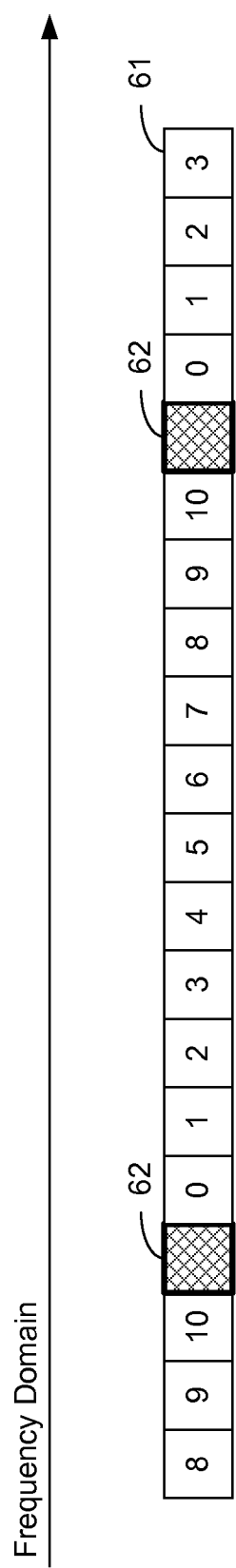
Figure 4C:
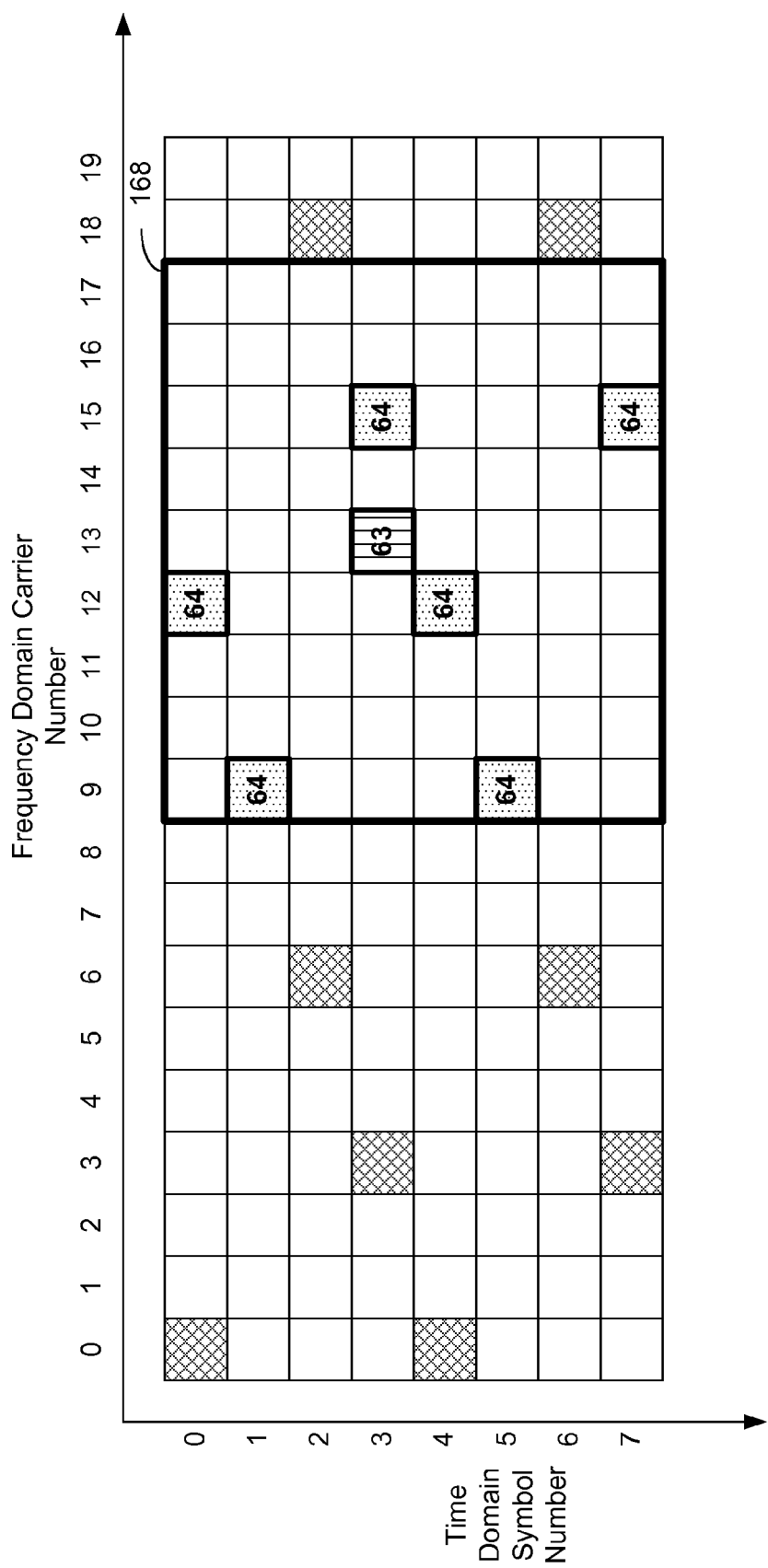

FIGS. 4a-4c illustrate a pilot pattern of a signal for selecting pilots and channel response coefficients. In particular, FIG. 4a illustrates a pilot pattern of a signal. The pilot pattern can be graphed in two dimensions to illustrate symbols and pilot symbols of the signal that are scattered within the signal at known locations. An axis of the graph is for the frequency domain carrier number (the horizontal axis in this example) and the other axis is for the time domain symbol number. The origin of the graph can be denoted (0,0), and be incrementally increased along each of the axes.

FIG. 4b illustrates a single time domain symbol number along a frequency domain carrier number axis. A single time domain symbol number 61 can have multiple frequency domain carrier numbers. Here, pilot symbols can be spaced every 11 carriers from each other. For instance, between pilot symbols 62, the carriers can be counted off from 0 to 10. After the second pilot symbol 62, another 0 to 10 can be counted off (not shown), until the next pilot symbol occurs. This pattern can be repeated for this time domain symbol number 61 and for other time domain symbol numbers of the signal.

FIG. 4c illustrates the pilot pattern of the signal. Here, a window 68 can circumscribe the area to be used for channel estimation of a symbol 63. Pilot symbols 64 can be used for channel estimation of the non-pilot symbol 63, which are all located within the window 68. In this example, six pilot carriers are used for channel estimation. However, it is understood that other numbers of pilot symbols can be used for channel estimation depending on the performance needs of the receiver system.

FIG. 4c illustrates the pilot pattern of the signal. Here, a window 168 can circumscribe the area to be used for channel estimation of a symbol 63. Pilot symbols 64 can be used for channel estimation of the non-pilot symbol 63, which are all located within the window 168. In this example, six pilot carriers are used for channel estimation. However, it is understood that other numbers of pilot symbols can be used for channel estimation depending on the performance needs of the receiver system.

The channel estimation for the m-th symbol and the n-th carrier can be denoted H(m, n). The carriers that participate in the calculation can form a window 168 consisting of 8 symbols by 9 carriers. The window size can vary depending on the performance requirements of the system.

The targeted channel estimation H(m,n) can be positioned in the middle of the window 168. Within the window 168, there are total six pilots (e.g., the pilots 64) that can participate in the channel estimation calculation. The signals received at the six pilot symbols 64 for the nine carriers can be denoted as $Y_P(m-3,n-1)$, $Y_P(m-2,n-4)$, $Y_P(m,n+2)$, $Y_P(m+1,n-1)$, $Y_P(m+2,n-4)$, and $Y_P(m+4,n+2)$.

Furthermore, for such pilot pattern, the pilot positions relative to each of the non-pilot carriers can be denoted as follows:

| # Carrier | Pilot 1 | Pilot2 | Pilot3 | Pilot4 | Pilot5 | Pilot6 |
|---|---|---|---|---|---|---|
| 0 | m − 3, n − 4 | m − 1, n + 2 | m, n − 1 | m + 1, n − 4 | m + 3, n + 2 | m + 4, n − 1 |
| 1 | m − 2, n + 4 | m − 1, n + 1 | m, n − 2 | m + 2, n | m + 3, n + 1 | m + 4, n − 2 |
| 2 | m − 2, n + 3 | m − 1, n | m, n − 3 | m + 2, n + 1 | m + 3, n | m + 4, n − 3 |
| 3 | m − 2, n + 2 | m − 1, n − 1 | m, n − 4 | m + 2, n + 2 | m + 3, n − 1 | m + 4, n − 4 |
| 4 | m − 3, n + 4 | m − 2, n + 1 | m − 1, n − 2 | m + 1, n | m + 2, n + 1 | m + 3, n − 2 |
| 5 | m − 3, n + 3 | m − 2, n | m − 1, n − 3 | m + 1, n + 1 | m + 2, n | m + 3, n − 3 |
| 6 | m − 3, n + 2 | m − 2, n − 1 | m − 1, n − 4 | m + 1, n + 2 | m + 2, n − 1 | m + 3, n − 4 |
| 7 | m − 3, n + 1 | m − 2, n − 2 | m, n + 4 | m + 1, n + 1 | m + 2, n − 2 | m + 4, n + 4 |
| 8 | m − 3, n | m − 2, n − 3 | m, n + 3 | m + 1, n | m + 2, n − 3 | m + 4, n + 3 |
| 9 | m − 3, n − 1 | m − 2, n − 4 | m, n + 2 | m + 1, n − 1 | m + 2, n − 4 | m + 4, n + 2 |
| 10 | m − 3, n − 2 | m − 1, n + 4 | m, n + 1 | m + 1, n − 2 | m + 3, n + 4 | m + 4, n + 1 |

For example, if the channel estimation H(3, 9), m=3 and n=9, then the six pilot symbols are denoted as follows: Yp(0,n−1), Yp(1,n−4), Yp(3, n+2), Yp(4,n−1), Yp(5,n−4), Yp(7,n+2) and correspondent coefficients are denoted as c(9,0) to c(9,5). Therefore, H(3,n)=C(9,0)*Yp(0,n−1)+C(9,1)*Yp(1, n−4)+C(9,2)*Yp(3, n+2)+C(9,3)*Yp(4,n−1)+C(9,4)*Yp(5, n−4)+C(9,5)*Yp(7,n+2).

Figure 5:
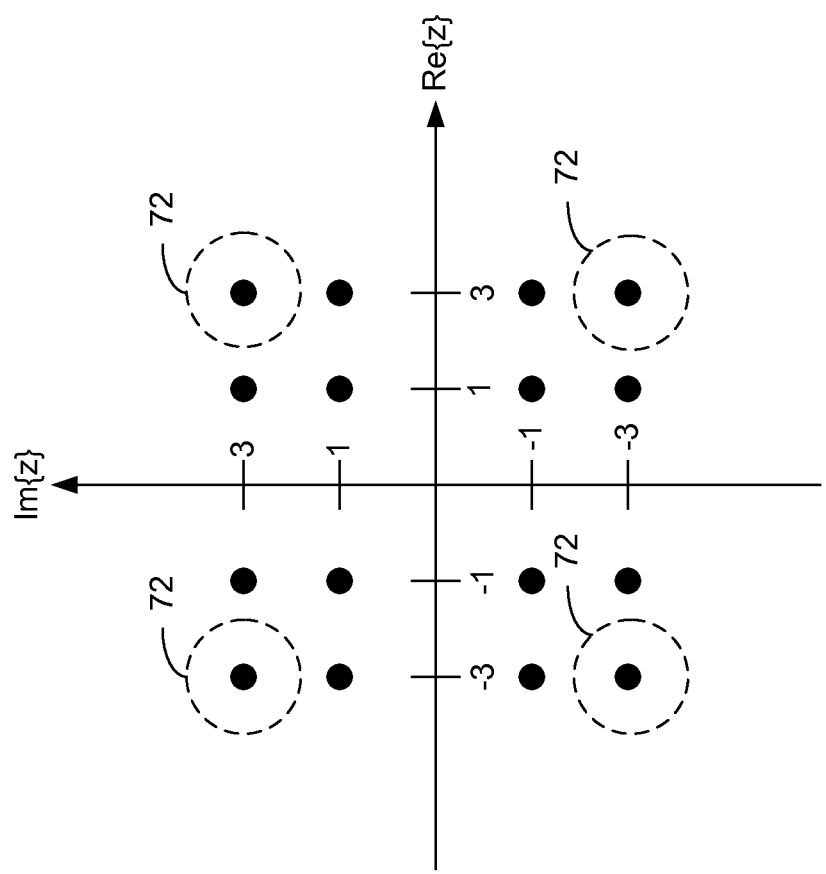
FIG. 5 illustrates outer corner points of a 16 QAM constellation for use in updating channel estimation coefficients.

FIG. 5 illustrates outer corner points of a 16-QAM constellation for use in updating channel estimation coefficients. In the above approach, for better performance, not every slicer output may be used to update the channel estimation coefficients. During carrier validation, specific slicer outputs are selected from the slicer output for channel estimation coefficients. Generally, the slicer can provide a quadrature amplitude modulation ("QAM"). Points along the outer ring or corner of the QAM constellation can be selected for use in updating the channel estimation coefficients since the signal-to-noise ratio ("SNR") along the outer ring or corner is typically higher than points within the QAM constellation.

For instance, in a 16-QAM constellation, points 72 at the outer ring of the 16-QAM constellation are selected for use in the channel estimation coefficient update. Since different QAM constellations have different levels of noise endurance level, the points used for channel estimation coefficient update can vary.

Figure 6:
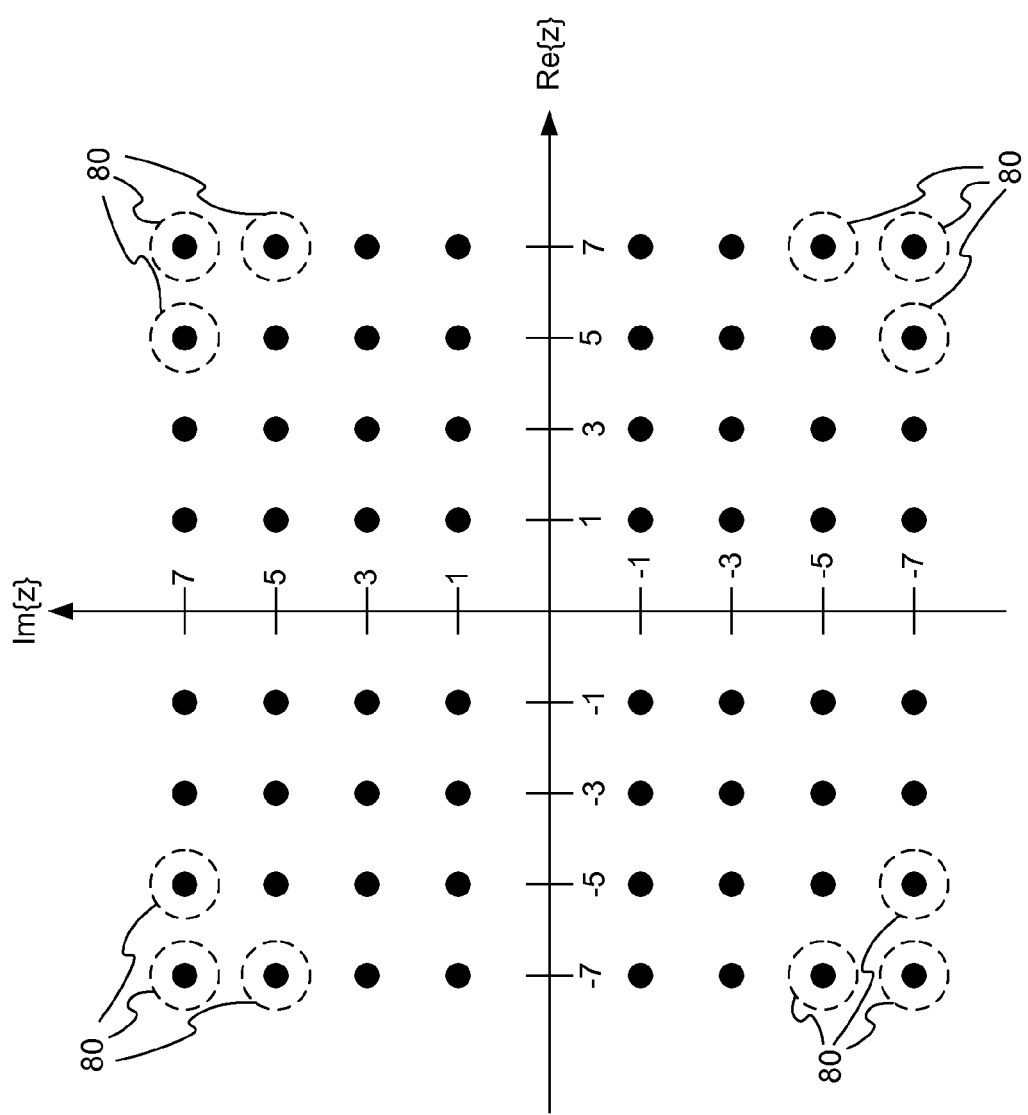
FIG. 6 illustrates outer corner points of a 64 QAM constellation for use in updating channel estimation coefficients.

FIG. 6 illustrates outer corner points of a 64-QAM constellation for use in updating channel estimation coefficients. In a 64-QAM constellation points 80 can be selected for use in updating the channel estimation coefficients.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A method for channel estimation of a signal Y(m,n), comprising the steps:

estimating a channel response for pilot carriers of the signal; and estimating a channel response for non-pilot carriers of the signal as a function of the channel response for the pilot carriers of the signal and channel estimation coefficients for the pilot carriers, wherein a symbol of the signal is decoded as a function of the estimated channel response for the non-pilot carriers, and wherein certain ones of the channel estimation coefficients are updated as a function of the channel estimation coefficients $C^k(m,n)$, a predefined constant μ, and a difference ϵ(m,n) between a channel response H(m,n) and a predicted channel response Ĥ(m,n).

2. The method of claim 1 wherein the decoded symbol is demapped as a function of the estimated channel response for the non-pilot carriers and wherein the symbol is at an outer constellation point of the demapping.

3. The method of claim 1 wherein the updated certain ones of the channel estimation coefficients equal:

$$C^k(m,n)+\mu^*\epsilon(m,n)^*Y(m,n).$$

4. The method of claim 1 wherein the channel estimation coefficients are updated using a two-dimensional adaptive filter.

5. The method of claim 1 wherein a window is utilized for channel estimation and wherein the window has a range of eight symbols and nine carriers.

6. The method of claim 1 wherein the channel estimation coefficients are divided into 11 groups, wherein each of groups is updated independently.

7. The method of claim 1 wherein the channel estimation coefficients are updated by outer corner constellations for higher constellation modulation.

8. The method of claim 2 wherein the predicted channel response for the non-pilot carriers Ĥ(m,n) is determined as a function of the signal Y(m,n) and the demapped symbol $X_d(m,n)$.

9. The method of claim 4 wherein the two-dimensional adaptive filter is a two dimensional least-mean-squares algorithm.

10. The method of claim 8 wherein Ĥ(m,n)=Y(m,n)/$X_d$(m, n) and wherein m is a symbol number and n is a carrier number.

11. A method for channel estimation of a signal Y(m,n) by a receiver, comprising the steps:

estimating a channel response for pilot carriers of the signal; and estimating a channel response for non-pilot carriers of the signal as a function of the channel response for the pilot carriers of the signal and channel estimation coefficients for the pilot carriers, wherein a symbol of the signal is decoded as a function of the estimated channel response for the non-pilot carriers, wherein certain ones of the channel estimation coefficients are updated as a function of the decoded symbol, wherein the decoded symbol is demapped as a function of the estimated channel response for the non-pilot carriers, wherein the symbol is at an outer constellation point of the demapping, and wherein the updated certain ones of the channel estimation coefficients equal:

$$C^k(m,n)+\mu^* \epsilon(m,n)^* Y(m,n),$$

where $C^k(m,n)$ is the channel estimation coefficients, $\mu$ is a predefined constant, and $\epsilon m,n)$ is a difference between a channel response $H(m,n)$ and a predicted channel response $\hat{H}(m,n)$.

12. The method of claim 11 wherein a predicted channel response for the non-pilot carriers $\hat{H}(m,n)$ is determined as a function of the signal $Y(m,n)$ and the demapped symbol $X_d(m,n)$.

13. The method of claim 11 wherein the channel estimation coefficients are updated using a two-dimensional adaptive filter.

14. The method of claim 11 wherein a window is utilized for channel estimation and wherein the window has a range of eight symbols and nine carriers.

15. The method of claim 11 wherein the channel estimation coefficients are divided into 11 groups, wherein each of groups is updated independently.

16. The method of claim 11 wherein the channel estimation coefficients are updated by outer corner constellations for higher constellation modulation.

17. The method of claim 12 wherein $\hat{H}(m,n)=Y(m,n)/X_d(m,n)$ and wherein m is a symbol number and n is a carrier number.

18. The method of claim 13 wherein the two-dimensional adaptive filter is a two dimensional least-mean-squares algorithm.

19. A method for channel estimation of a signal $Y(m,n)$ by a receiver, comprising the steps:

estimating a channel response for pilot carriers of the signal; and estimating a channel response for non-pilot carriers of the signal as a function of the channel response for the pilot carriers of the signal and channel estimation coefficients for the pilot carriers, wherein certain ones of the channel estimation coefficients are updated by each of the non-pilot carries, wherein the updated certain ones of the channel estimation coefficients $C^{k+1}(m,n)$ are equal to:

$$C^k(m,n)+\mu^* \epsilon(m,n)^* Y(m,n),$$

where $C^k(m,n)$ are previous channel estimation coefficients, $\mu$ is a predefined constant, and $\epsilon(m,n)$ is a difference between a channel response $H(m,n)$ and a predicted channel response $\hat{H}(m,n)$, wherein certain ones of the pilot carries are selected for channel estimation, and wherein the certain ones of the pilot carries are within a window of M symbols in a time domain by N carriers in a frequency domain.

* * * * *